US007455230B2

(12) United States Patent
Junger et al.

(10) Patent No.: US 7,455,230 B2
(45) Date of Patent: Nov. 25, 2008

(54) UPC, EAN AND JAN VALIDATION SYSTEM AND METHOD FOR LOSS PREVENTION AT POINT OF SALE/RETURN

(75) Inventors: Peter J. Junger, Redmond, WA (US); Kristin Secreto, Kirkland, WA (US)

(73) Assignee: Nintendo of America Inc., Redmond, WA (US)

( * ) Notice: Subject to any disclaimer, the term of this patent is extended or adjusted under 35 U.S.C. 154(b) by 36 days.

(21) Appl. No.: 11/405,674

(22) Filed: Apr. 18, 2006

(65) Prior Publication Data

US 2006/0237534 A1 Oct. 26, 2006

Related U.S. Application Data

(60) Provisional application No. 60/673,791, filed on Apr. 22, 2005.

(51) Int. Cl.
*G06K 7/10* (2006.01)

(52) U.S. Cl. ............................ 235/462.07; 235/462.01

(58) Field of Classification Search ................. 235/435, 235/462.07, 462.01, 375, 383, 385
See application file for complete search history.

(56) References Cited

U.S. PATENT DOCUMENTS

| | | | |
|---|---|---|---|
| 789,106 | A | 5/1905 | Seymour |
| 1,330,368 | A | 2/1920 | Boos |
| 1,393,489 | A | 10/1921 | Boos |
| 1,476,819 | A | 12/1923 | Hope |
| 4,312,037 | A | 1/1982 | Yamakita |
| 4,414,467 | A | 11/1983 | Gould et al. |
| 4,458,802 | A | 7/1984 | Maciver et al. |
| 4,563,739 | A | 1/1986 | Gerpheide et al. |
| 4,598,810 | A | 7/1986 | Shore et al. |
| 4,668,150 | A | 5/1987 | Blumberg |

(Continued)

FOREIGN PATENT DOCUMENTS

| | | |
|---|---|---|
| DE | 3 315 724 | 10/1984 |

(Continued)

OTHER PUBLICATIONS

Information Disclosure Statement filed in U.S. Appl. No. 09/509,021, on Oct. 26, 2001.

(Continued)

*Primary Examiner*—Michael G. Lee
*Assistant Examiner*—Paultep Savusdiphol
(74) *Attorney, Agent, or Firm*—Nixon & Vanderhye P.C.

(57) ABSTRACT

The invention provides a process/system that validates the authenticity of the product UPC, EAN, JAN, RFID, EPC and/or equivalent code, in real-time, while a transaction is taking place. A database is preferably maintained including a list of suspected false or counterfeit UPC, EAN, JAN, RFID, EPC, and/or equivalent number or first digits, and further includes a list of key descriptive text or numbers found on a product or a product's packaging that will either corroborate or contradict the real brand name with the brand encoded in the UPC, EAN, JAN, RFID EPC, and/or equivalent number. The invention allows a transaction if the item is not found in the database of suspect or counterfeit items, or if all of the identifiers match a record in the database; otherwise, the transaction is denied.

42 Claims, 7 Drawing Sheets

U.S. PATENT DOCUMENTS

| | | | | |
|---|---|---|---|---|
| 4,734,005 | A | 3/1988 | Blumberg | |
| 4,750,119 | A | 6/1988 | Cohen et al. | |
| 4,789,054 | A | 12/1988 | Shore et al. | |
| 4,792,018 | A * | 12/1988 | Humble et al. | 186/61 |
| 4,803,348 | A | 2/1989 | Lohrey et al. | |
| 4,812,629 | A | 3/1989 | O'Neil et al. | |
| 4,814,592 | A | 3/1989 | Bradt et al. | |
| 4,839,505 | A | 6/1989 | Bradt et al. | |
| 4,858,743 | A | 8/1989 | Paraskevakos et al. | |
| 4,866,661 | A | 9/1989 | de Prins | |
| 4,871,054 | A | 10/1989 | Murray | |
| 4,884,212 | A | 11/1989 | Stutsman | |
| 4,893,705 | A | 1/1990 | Brown | |
| 4,896,024 | A | 1/1990 | Morello et al. | |
| 4,903,815 | A | 2/1990 | Hirschfeld et al. | |
| 4,967,906 | A | 11/1990 | Morello et al. | |
| 4,984,155 | A | 1/1991 | Geier et al. | |
| 4,997,076 | A | 3/1991 | Hirschfeld et al. | |
| 5,007,518 | A | 4/1991 | Crooks et al. | |
| 5,020,958 | A | 6/1991 | Tuttobene | |
| 5,028,766 | A | 7/1991 | Shah | |
| 5,042,686 | A | 8/1991 | Stucki | |
| 5,128,520 | A | 7/1992 | Rando et al. | |
| 5,128,527 | A * | 7/1992 | Kawai et al. | 235/462.07 |
| 5,133,441 | A | 7/1992 | Brown | |
| 5,139,384 | A | 8/1992 | Tuttobene | |
| 5,143,193 | A | 9/1992 | Geraci | |
| 5,159,560 | A | 10/1992 | Newell et al. | |
| 5,216,612 | A | 6/1993 | Cornett et al. | |
| 5,231,569 | A * | 7/1993 | Myatt et al. | 705/38 |
| 5,256,863 | A | 10/1993 | Ferguson et al. | |
| 5,257,741 | A | 11/1993 | Rode et al. | |
| 5,273,183 | A | 12/1993 | Tuttobene | |
| 5,311,424 | A | 5/1994 | Mukherjee et al. | |
| 5,372,386 | A | 12/1994 | Mills | |
| 5,375,240 | A | 12/1994 | Grundy | |
| 5,414,252 | A * | 5/1995 | Shinoda et al. | 235/462.07 |
| 5,416,306 | A | 5/1995 | Imahata | |
| 5,478,990 | A | 12/1995 | Montanari et al. | |
| 5,520,990 | A | 5/1996 | Rotermund | |
| 5,521,815 | A | 5/1996 | Rose, Jr. | |
| 5,537,314 | A | 7/1996 | Kanter | |
| 5,541,394 | A | 7/1996 | Kouchi et al. | |
| 5,581,064 | A * | 12/1996 | Riley et al. | 235/383 |
| 5,602,377 | A | 2/1997 | Beller et al. | |
| 5,671,279 | A | 9/1997 | Elgamal | |
| 5,712,989 | A | 1/1998 | Johnson et al. | |
| 5,721,832 | A | 2/1998 | Westrope et al. | |
| 5,737,726 | A | 4/1998 | Cameron et al. | |
| 5,745,036 | A | 4/1998 | Clare | |
| 5,799,285 | A | 8/1998 | Klingman | |
| 5,804,803 | A | 9/1998 | Cragun et al. | |
| 5,857,175 | A | 1/1999 | Day et al. | |
| 5,889,270 | A | 3/1999 | Van Haagen et al. | |
| 5,895,453 | A | 4/1999 | Cook | |
| 5,913,210 | A | 6/1999 | Call | |
| 5,918,213 | A | 6/1999 | Bernard et al. | |
| 5,918,214 | A | 6/1999 | Perkowski | |
| 5,949,335 | A | 9/1999 | Maynard | |
| 5,950,173 | A | 9/1999 | Perkowski | |
| 5,966,450 | A | 10/1999 | Hosford et al. | |
| 5,968,110 | A | 10/1999 | Westrope et al. | |
| 5,978,774 | A * | 11/1999 | Rogers et al. | 705/24 |
| 5,984,508 | A | 11/1999 | Hurley | |
| 6,014,635 | A | 1/2000 | Harris et al. | |
| 6,016,480 | A | 1/2000 | Houvener et al. | |
| 6,018,719 | A | 1/2000 | Rogers et al. | |
| 6,025,780 | A | 2/2000 | Bowers et al. | |
| 6,029,139 | A | 2/2000 | Cunningham et al. | |
| 6,029,141 | A | 2/2000 | Bezos et al. | |
| 6,039,244 | A | 3/2000 | Finsterwald | |
| 6,049,778 | A | 4/2000 | Walker et al. | |
| 6,055,511 | A | 4/2000 | Luebbering et al. | |
| 6,064,979 | A | 5/2000 | Perkowski | |
| 6,085,167 | A | 7/2000 | Iguchi | |
| 6,085,172 | A | 7/2000 | Junger | |
| 6,105,001 | A | 8/2000 | Masi et al. | |
| 6,115,690 | A | 9/2000 | Wong | |
| 6,119,099 | A | 9/2000 | Walker et al. | |
| 6,119,164 | A | 9/2000 | Basche | |
| 6,125,352 | A | 9/2000 | Franklin et al. | |
| 6,131,088 | A | 10/2000 | Hill | |
| 6,134,533 | A | 10/2000 | Shell | |
| 6,148,249 | A | 11/2000 | Newman | |
| 6,154,738 | A | 11/2000 | Call | |
| 6,219,652 | B1 | 4/2001 | Carter et al. | |
| 6,222,914 | B1 | 4/2001 | McMullin | |
| 6,269,344 | B1 | 7/2001 | Junger | |
| 6,317,028 | B1 | 11/2001 | Valiulis | |
| 6,463,421 | B2 | 10/2002 | Junger | |
| 6,542,933 | B1 | 4/2003 | Durst et al. | |
| 6,550,685 | B1 * | 4/2003 | Kindberg | 235/494 |
| 6,554,187 | B2 | 4/2003 | Otto | |
| 6,697,812 | B1 | 2/2004 | Martin | |
| 6,757,663 | B1 | 6/2004 | Rogers et al. | |
| 7,118,478 | B2 * | 10/2006 | Fayter et al. | 463/25 |
| 2002/0032612 | A1 | 3/2002 | Williams et al. | |
| 2002/0116274 | A1 | 8/2002 | Hind et al. | |
| 2003/0094494 | A1 * | 5/2003 | Blanford et al. | 235/462.07 |
| 2003/0126034 | A1 | 7/2003 | Cheney et al. | |
| 2003/0141358 | A1 * | 7/2003 | Hudson et al. | 235/375 |
| 2004/0054900 | A1 | 3/2004 | He | |
| 2004/0153344 | A1 | 8/2004 | Bui et al. | |
| 2004/0172260 | A1 | 9/2004 | Junger et al. | |
| 2004/0195341 | A1 | 10/2004 | Lapstun et al. | |
| 2005/0100144 | A1 | 5/2005 | O'Connor | |
| 2006/0175401 | A1 * | 8/2006 | Roberts | 235/383 |

FOREIGN PATENT DOCUMENTS

| | | |
|---|---|---|
| EP | 0 068 642 | 1/1983 |
| EP | 0 191 636 | 8/1986 |
| EP | 0 286 130 | 10/1988 |
| EP | 0 349 284 | 1/1990 |
| EP | 0 845 749 | 6/1998 |
| EP | 0 862 154 | 9/1998 |
| FR | 2 559 599 | 8/1985 |
| GB | 2 143 662 | 2/1985 |
| GB | 2 203 879 | 10/1988 |
| GB | 2 209 157 | 5/1989 |
| GB | 2 209 158 | 5/1989 |
| JP | 02-139698 | 5/1990 |
| JP | 405178422 A | 7/1993 |
| JP | 405342482 A | 12/1993 |
| JP | 10188141 | 7/1998 |
| JP | 11066176 | 3/1999 |
| WO | 87/00948 | 2/1987 |
| WO | 88/02524 | 4/1988 |
| WO | 88/067771 | 9/1988 |
| WO | 89/09460 | 10/1989 |
| WO | 92/01273 | 1/1992 |
| WO | 99/33016 | 7/1999 |

OTHER PUBLICATIONS

Information Disclosure Statement filed in U.S. Appl. No. 09/065,552, on Jul. 19, 1999.

Information Disclosure Statement filed in U.S. Appl. No. 08/725,259, on Oct. 5, 1998.

Nintendo Point of Purchase Mail-In Card.

1994 Nintendo Product Returns Policies and Procedures.

1995 Nintendo Product Returns Policies and Procedures.

1996 Nintendo Product Returns Policies and Procedures.

1992 Nintendo Product Returns Policy.

John Longwell, “Robec Links its 18 Sales Facilities Via Newly Adopted NetWare System”, Computer Reseller News, Sep. 6, 1993.
Software Maker Promises Many Happy Returns, Drug Topics, Mar. 4, 1996, vol. 140, No. 5, pp. 124-128.
Direct Return 2000, Software Overview, http://www.directreturn.com/software¯overview.htm, Oct. 2, 2000.
Amazon.com Returns Policy, Our Return Policy is Simple, Jun. 20, 2000, Amazon.com, www.amazon.com/exec/obidos/subst/help/returns-policy.html, pp. 1-2.
Leyden, “Burgled mum finds stolen iPod on eBay,” The Register, May 17, 2005, 1 page.
“Man accused in Lego selling scam,” http://www.kptv.com/Global/story.asp?S=4137050&nav=munil56 2, Nov. 18, 2005, 1 page.
Grace, “Reseller Profile - Reynolds and Reynolds; Reynolds goes extra mile -- Evolving solutions continue to fuel clients’ capabilities”, Computer Reseller News, CMP Publications, Inc., Feb. 21, 1994, 2 pages.
PR Newswire, “CompuServe Introduces Electronic Product Registration Software”, PR Newswire Association, Inc. Mar. 10, 1994, 2 pages.
Longwell, “Western Digital Wins -- Price/performance gives driver maker vitory margin”, Computer Reseller News, CMP Publications, Inc., Jun. 28, 1993, 3 pages.
Grace, “ABCD Looks to Adopt EDI Transaction Sets”, Computer Reseller News, CMP Publications, Inc., Jun. 28, 1993, 2 pages.
Discount Store News, “New Policy System can Par Suspect Returns, Cut Losses”, Discount Store News, Lebhar-Friedman Inc., Jan. 1, 1996, 2 pages.
Synchronics® User Manual: Point of Sale, Version 6.5, Apr. 1993 (ON 004464-ON 005116).
Synchronics® User Manual: Inventory Plus, Version 6.5, Apr. 1993 (ON 005117-ON 005892).
collins, David Jarrett and Nancy Nasuti Whipple, Using Bar Code: Why It’s Taking Over, Second Edition (ON 003696-ON 004031).
Birnbaum, Henry, General Information Manual: IBM Circulation Control at Brooklyn College Library, 29pp. (ON 001822-ON 001850).
White, Howard S., Library Technology Reports, Mar.-Apr. 1982, Vol. 18, No. 2, pp. 178-184 (ON 001851-ON 001858).
Cooper, Michael D., Design of Library Automation Systems, pp. 83-109 (ON 1859-ON 001873).
Corbin, John, Developing Computer-Based Library Systems, pp. 144-149 (ON 001874-ON 001877).
DataPhase, Inc. Automated Circulation System, 43 pp. (ON 001878-ON 001904).
Dranov, Paula, Automated Library Circulation Systems, 1977-78, pp. 24-47 (ON 001905-ON 001929).
Hoadley, Irene Braden and A. Robert Thorson, An Automated On-Line Circulation System: Evaluation, Development, Use, 1973, 19 pp. (ON 001930-ON 001948).
Meyer, James, “NOTIS: The System and Its Features”, Library Hi Tech, Issue 10, vol. 3, No. 2, 1985, pp. 81-89 (ON 001949-ON 001959).
Dowlin, Kenneth E., “Maggie III: The Prototypical Library System”, Library Hi Tech, Issue 16, vol. 4, No. 4, Winter 1986, pp. 7-15 (ON 001960-ON 001970).
Matthews, Joseph R., “Graphical User Interfaces GUI in Library Products”, Library Technology Reports, vol. 32, No. 1, Jan. 1996, p. 53 (ON 001972-ON 001976).
Saffady, William, “Intergrated Library Systems for Microcomputers and Mainframes: A Vendor Study”, Library Technology Reports, vol. 30, No. 1, Jan. 1994, p. 5 (ON 001977-ON 002087).
Saffady, William, “Vendors of Intergrated Library Systems for Minicomputers and Mainframes: An Industry Report, part 1”, Library Technology Reports, vol. 33, No. 2, Mar. 1997, p. 161 (ON 002088-ON 002096).
Saffady, William, “Vendors of Integrated Library Systems for Microcomputers and Mainframes: An Industry Report, part 2”, Library Technology Reports, vol. 33, No. 3, May 1997, p. 277 (ON 002097-ON 002138).
Salton, Gerard, Dynamic Information and Library Processing, pp. 62-69 (ON 002139-ON 002143).
Grosch, Audrey N., Distributed Computing and the Electronic Library: Micros to Superminis, pp. 78-79 (ON 002144-ON 002146).
Reynolds, Dennis, Library Automation: Issues and Applications, pp. 42-49 and pp. 146-149 (ON 002147-ON 002153).
Salmon, Stephen R., Library Automation Systems, p.239 (ON 002154-ON 002155).
Synchronics Software Product Information guide, 95 pages.
Direct Return 2000, Software Overview, http://www.directreturn.com/software_overview.htm, Copyright © 2000 Pharmacy Software Soltutions, Inc.
“Retailing in Cyberspace”, Narda News, Apr. 1995, pp. 21-22.
PR Newswire, “Escada Offers A Garden Variety For Spring”, PR Newswire Association, Inc., Mar. 10, 1994, 2 pages.
Automotive News, “Reynolds, ADP differ on superhighway progress”, Crain Communications, Inc., Apr. 11, 1994, 3 pages.
Computer Reseller News, “CASE STUDY; Tapping The Channel’s ‘Best in Class’”, CMP Publications, Inc., Jan. 30, 1995, 2 pages.
Rigney, “User Migrates to Windows NT”, InternetWeek, CMP Publications, Inc., Jan. 10, 1994, 2 pages.
Business Wire, “Multimillion-dollar Health-care Products”, Business Wire, Inc., Dec. 15, 1993, 2 pages.
Margulis, “Reclaim: an efficient way to handle damaged products”, U.S. Distribution Journal, BMT Publications Inc., Mar. 15, 1992, 7 pages.
Jiji Press Ticker Service, “Miti Working Out Business Practice Guidelines”, Jiji Press Ltd., Apr. 20, 1990, 1 page.
Jiji Press Ticker Service, “JCCI Issues Booklet To Explain Distribution”, Jiji Press Ltd., Jul. 20, 1989, 1 page.
Business Wire, “Aztech Labs Inc. is Chosen as Business Depot’s ‘Vendor of the Year’; Canadian Company Honors Multimedia Hardware Manufacturer as Number One in Company Category”, Business Wire, Inc., May 6, 1996, 2 pages.
LaPlante, “Rugby Darby; From proprietary host to a distributed LAN-based architecture in 2 years”, InfoWorld, InfoWorld Media Group, Nov. 15, 1993, 4 pages.
WItt et al., “Distribution: a differentiator in 2000”, Material Handling Engineering, Penton Publishing Inc., Oct. 1995, 15 pages.
Grotta, “Return to vendor: the right way to make mail-order returns”, PC Sources, Information Access Company, a Thomson Corporation Company, ASAP Coastal Associates Publishing L.P., Feb. 1992, 10 pages.
Consumer Electronics, Warren Publishing, Inc., Consumer Electronics Personals, vol. 35, No. 6, p. 18.
Business Wire, “DataTrend receives award from AT&T Global Information Solutions”, Business Wire, Inc., Nov. 7, 1995, 2 pages.
Quinn, “Why Wang took the third-party route”, Information Access Company, a Thomson Corporation Company, ASAP Reed Publishing USA, vol. 30, No. 2, p. 30, Feb. 1991.
Rogers et al., “Going Backwards: Reverse Logistics Trends and Practices”, Reverse Logistics Executive Council, 1998 (entire book).
IBM Systems Journal, vol. 14, No. 1, 1975, pp. 1-101.
College TermPapers web page printout, “History of Fed Ex”, www.collegetermpaper...rmPapers/Aviation/history_of_fed_ex.html (Aug. 24, 2001), 7 pages.
Rosenbloom, “Midnight Express”, Inc., Jul. 2001, 4 pages.
Sleeper, “FedEx Pushes The Right Buttons to Remain No. 1 in Fast Shipping”, Investor’s Business Daily, May 25, 2001, 2 pages.
Brewin et al., “Follow That Package!”, Computer World, vol. 35, No. 12, Mar. 19, 2001, 4 pages.
Joachim, “FedEx Delivers On CEO’s IT Vision”, InternetWeek, Oct. 25, 1999, 4 pages.
Federal Express Information Packet, 56 pages (incl. cover and table of contents).
Sigafoos et al., “Absolutely Positively Overnight!: The Unofficial Corporate History of Federal Express”, St. Luke Press, 1988, pp. 1-22.
Witt, “How To Master The Art of Returns: Automation Is The Key”, Material Handling Engineering, Jun. 1994, pp. 58-60.
Dilger, “The Other Direction”, Manufacturing Systems, vol. 15, No. 10, pp. 12-13 (Oct. 1997).
“Computer City Moves to Consolidate Returns”, Computer Retail Systems, vol. 6, No. 125, Jan. 22, 1998, 2 pages.
Dreamcom web page printout, www.dreamcomdirect.com/RNA.htm (May 25, 1997).

* cited by examiner

UPC, EAN AND JAN VALIDATION SYSTEM AND METHOD FOR LOSS PREVENTION AT POINT OF SALE/RETURN

CROSS-REFERENCES TO RELATED APPLICATIONS

The application claims the benefit of U.S. Provisional Application Ser. No. 60/673,791, filed Apr. 22, 2005, the entire disclosure of which is incorporated herein by reference.

FIELD OF THE INVENTION

The present invention relates to retail loss prevention and other applicable areas where a Universal Product Code (UPC), EAN Article Numbering Code (EAN), Japanese Article Numbering Code (JAN), RFID, Electronic Product Code (EPC) and/or equivalent product numbering code(s) can be switched to enable a person to buy or gain possession of a product for less then the true product price/value.

BACKGROUND AND SUMMARY OF THE INVENTION

Retailers incur sizable revenue losses due to customers switching product identifiers (e.g., barcode labels) (UPC, EAN, JAN, RFID, EPC and/or equivalent numbering or other identifier on expensive items with labels representing barcodes (or SKU numbers or other relevant identifier(s)) of less expensive items, at points-of-sale and/or when an item is returned to a store, or to an e-tailer (online retailer) distribution center.

Advancements in technology and print quality of inexpensive printers used in the home have made it possible to reproduce barcode labels of "C" quality ratings or above that can be scanned (by a hand-held or flat-bed scanner) and read by a store's point-of-sale register.

A specific barcode can be reproduced in a multitude of ways. For example, an inexpensive product version of the same brand or a competing brand or entirely different item is purchased, and then the barcode is scanned (by a scanner typically used to reproduce photos to a digital image) and printed on a white label. A counterfeit barcode label also can be produced using software specifically designed to generate barcode labels from human readable numbers.

An individual simply walks into a store, places the counterfeit label on top of the existing label on a much more expensive product, and then walks up to the cash register and purchases the product at a significantly reduced price.

An unsuspecting store associate or an associate working during very busy peak holiday seasons is not likely to notice the switch or counterfeit transaction. As a result, the individual is able to obtain the product for less than the actual price, thereby resulting in a loss for the manufacturer/retailer.

The following example of this type of fraud, in which an individual buys an expensive vacuum cleaner and switches the UPC barcode with a UPC barcode label representing a less expensive brand, will illustrate the above problem and the features of the exemplary illustrative embodiments below:

The UPC barcode label on a Dyson vacuum cleaner, model "DC07 RootCyclone Animal" with a retail price of $499.00 is switched with a less expensive vacuum cleaner UPC barcode label representing a Dirt Devil Vision with Turbo Vacuum—088400, with a retail price of $99.99.

In this example, the individual defrauded the retailer out of $400.00. Retailers sustain millions of dollars in losses annually due to this type of fraudulent activity.

The instant invention provides a method/system to identify a product where a Universal Product Code (UPC), EAN Article Numbering Code (EAN), Japanese Article Numbering (JAN), and/or equivalent product numbering code(s), including RFID EPC labels, can be switched to misrepresent a product and enable a person to buy or gain possession of a product for less then the true product price/value.

The process to validate a UPC, EAN, JAN, and/or equivalent product numbering code(s), including RFID EPC, can include multiple layers, depending on the product value. In other words, more stringent validation may be desirable and provided on higher priced items or certain product categories that are more susceptible to fraud.

In accordance with one embodiment of the present invention, a method is provided for preventing losses by preventing fraudulent transactions relating to an item by first requiring a user to enter a first identifier and a second identifier of the item. Then, the first identifier is looked up in a database of suspect or counterfeit items. The transaction is allowed if the first identifier is not present in the database, or if the second identifier corresponds with a record associated with a first identifier present in the database. Alternatively, the transaction is denied if the first identifier is present in the database and the second identifier does not correspond with a record associated with the first identifier present in the database. It should be noted that the first identifier may be, for example, a UPC, EAN, JAN, RFID, EPC and/or equivalent product numbering code(s). Additionally, the second identifier may be, for example, a brand, model name, model number, characters/letters on packaging, product date code, lot number, etc.

In accordance with another embodiment of the present invention, a method is provided for preventing losses by preventing fraudulent transactions relating to an item by first requiring a user to enter a first identifier and a plurality of second identifiers of the item. Then, the first identifier is looked up in a database of suspect or counterfeit labels or item identifiers. The transaction is allowed if the first identifier is not present in the database, or if the entire plurality of second identifiers correspond with a record associated with a first identifier present in the database. Alternatively, the transaction is denied if the first identifier is present in the database and any second identifier in the plurality of second identifiers does not correspond with a record associated with the first identifier present in the database. It should be noted that the first identifier may be, for example, a UPC, EAN, JAN, RFID, EPC and/or equivalent product numbering code(s). Additionally, the plurality of second identifiers may comprise, for example, a brand, model name, model number, etc. It should also be noted that a transaction may be permitted if only a certain number of second identifiers in the plurality of second identifiers do not match a record in the database, allowing a transaction on an item that has a close, though not exact, match.

In accordance with still another embodiment of the present invention, a system is provided for preventing losses at a transaction point by preventing fraudulent transactions relating to an item. An input device (e.g., scanner, RFID reader, etc.) allows a user to input a first identifier and a second identifier of the item. A searching routine looks up the first identifier in a database of suspect or counterfeit items. A gatekeeper switch allows the transaction if the first identifier is not present in the database, or if present, if the second identifier corresponds with a record associated with the first identifier present in the database. Alternatively, the gatekeeper switch denies the transaction if the first identifier is present in the database and the second identifier does not correspond with a record associated with the first identifier present in the database. It should be noted that the gatekeeper switch may consist of a software routine, a hardware component, or any method or device capable of directing the system to a certain step depending on whether the first identifier was found in the database. It also should be noted that the first identifier may be, for example, a UPC, EAN, JAN, RFID, EPC and/or equivalent product numbering code(s). Additionally, the second identifier may be, for example, a brand, model name, model number, etc.

In accordance with still another embodiment of the present invention, a system is provided for preventing losses at a transaction point by preventing fraudulent transactions relating to an item. An input device allows a user to input a first identifier and a plurality of second identifiers of the item. A searching routine looks up the first identifier in a database of suspect or counterfeit items. A gatekeeper switch allows the transaction if the first identifier is not present in the database, or if the plurality of second identifiers correspond with a record associated with the first identifier present in the database. Alternatively, the gatekeeper switch denies the transaction if the first identifier is present in the database and any second identifier in the plurality of second identifiers does not correspond with a record associated with the first identifier present in the database. It should be noted that the gatekeeper switch may consist of a software routine, a hardware component, or any method or device capable of directing the system to a certain step depending on whether the first identifier was found in the database. It also should be noted that the first identifier may be, for example, a UPC, EAN, JAN, RFID, EPC and/or equivalent product numbering code(s). Additionally, the plurality of second identifiers may comprise, for example, a brand, model name, model number, etc. It should also be noted that a transaction may be permitted if only a certain number of second identifiers in the plurality of second identifiers do not match a record in the database, allowing a transaction on an item that has a close, though not exact, match.

DETAILED DESCRIPTION OF THE INVENTION

The present invention is described in the context of particular exemplary embodiments. However, it will be recognized by those of ordinary skill that modification, extensions and changes to the disclosed exemplary embodiments may be made without departing from the scope and spirit of the invention. For instance, although the invention is described primarily in the context of a retailer/manufacturer situation, the features, characteristics and advantages of the present invention could likewise be applied to a store/headquarters situation, a retailer/distributor situation or a distributor/fulfillment center situation. In short, the present invention is not limited to the particular forms disclosed.

The invention provides a process/system that validates the authenticity of the product UPC, EAN, JAN, RFID, EPC and/or equivalent numbering code, in real-time, while a transaction is taking place. The type of transaction typically will be the sale of an item, though it also may be, for example, the return of an item.

A database is preferably maintained comprising a list of suspected false or counterfeit UPC, EAN, JAN, RFID, EPC, and/or equivalent number or first digits (e.g., five or equivalent), representing the brand and/or manufacturer. The list can be one item, many items, or all items in inventory. The database further comprises a list of key descriptive text or numbers (or first few characters) found on a product's packaging (or on a product in a case where the product has no packaging)—e.g. brand name, model name, model number, manufacturer name, etc., that will either corroborate or contradict the brand name on the box with the brand encoded in the UPC, EAN, JAN, EPC, and/or equivalent number.

Validation of a UPC, EAN, JAN, RFID, EPC and/or equivalent numbering code, can consist of multiple layers, depending, for example, on the product value or product category susceptible to fraud. In some cases, more stringent validation may be desirable for higher priced items.

Figure 1A:
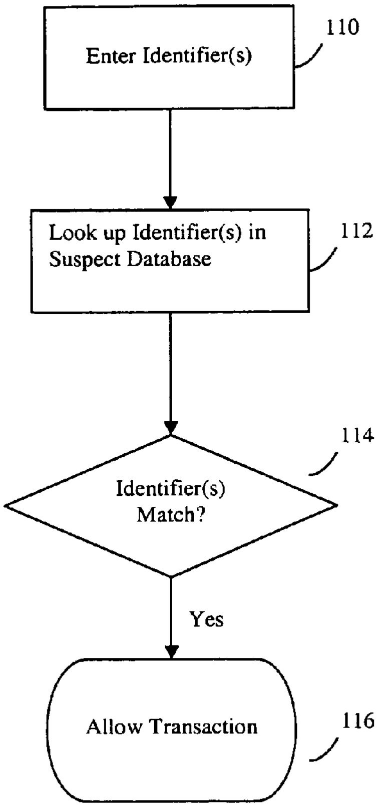
FIG. 1A is a flowchart showing a generic validation system that processes all identifiers at once and ultimately allows the transaction.

FIG. 1A is a flowchart showing an exemplary generic validation system that ultimately allows the transaction. In step 110, a user (e.g. a sales clerk or customer service representative) inputs an identifier or plurality of identifiers for an item involved in a transaction (e.g. a sale, return, etc.). It should be noted that the item data could be entered by scanning, typing, or otherwise inputting the data. It also should be noted that one of the identifiers should be a first UPC, EAN, JAN, RFID, EPC or equivalent numbering code. In step 112, the system verifies the identifier or plurality of identifiers against the database of suspect items. Step 114 determines whether the identifiers entered by the user match a record in the database of suspect or counterfeit items. The process of checking records in the database is detailed in FIG. 3. After all of the identifiers are successfully matched to a record in the database, step 116 indicates a successful transaction.

Figure 2A:
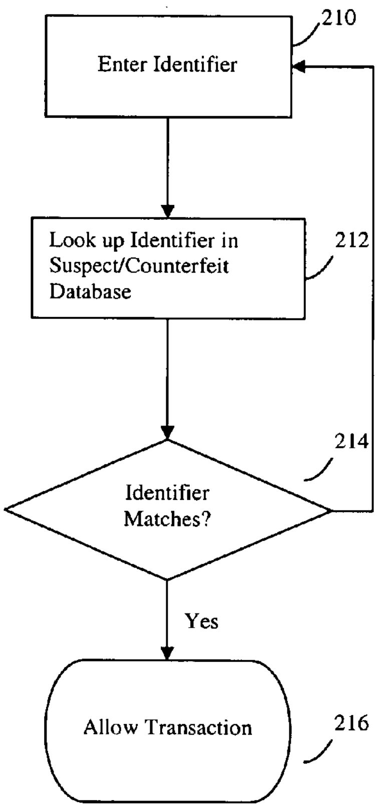
FIG. 2A is a flowchart showing a generic validation system that processes identifiers one-at-a-time and ultimately allows the transaction.

Although FIG. 1A indicates that all of the identifiers are entered and checked together in one step, it should be noted that the identifiers could be entered and checked one-at-a-time, as in FIG. 2A. In FIG. 2A, the system reaches acceptance step 216 after all of the identifiers are checked individually against the database of suspect or counterfeit items. This is accomplished by performing steps 210 (entering an identifier), 212 (looking up the identifier in the database), and 214 (determining whether there is a match), for each identifier entered.

Figure 1B:
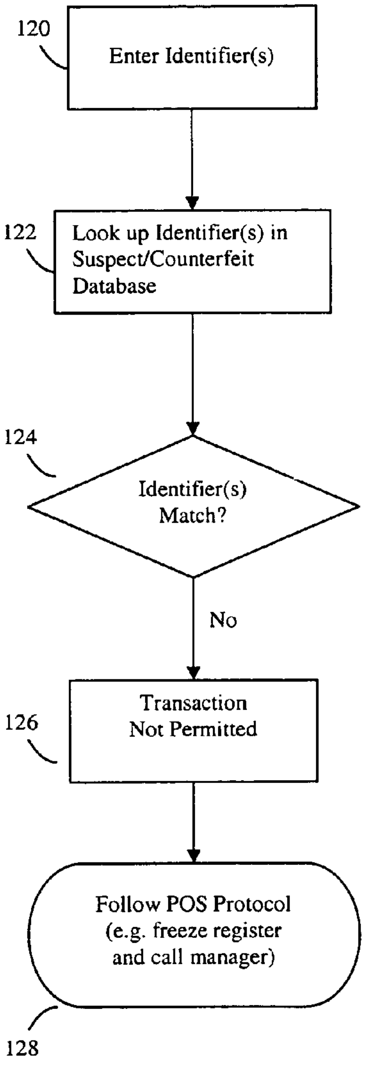
FIG. 1B is a flowchart showing a generic validation system that processes all identifiers at once and ultimately denies the transaction.

FIG. 1B is a flowchart showing an exemplary generic validation system that ultimately denies the transaction. In step 120, a user inputs an identifier or plurality of identifiers for an item involved in a transaction. In step 122, the system verifies the identifier or plurality of identifiers against the database of suspect or counterfeit items. Step 124 determines whether the identifiers match a record in the database. The process of checking records in the database is detailed in FIG. 3. Step 126 indicates a failed transaction after at least one of the identifiers fail to successfully match to a record in the database.

Figure 2B:
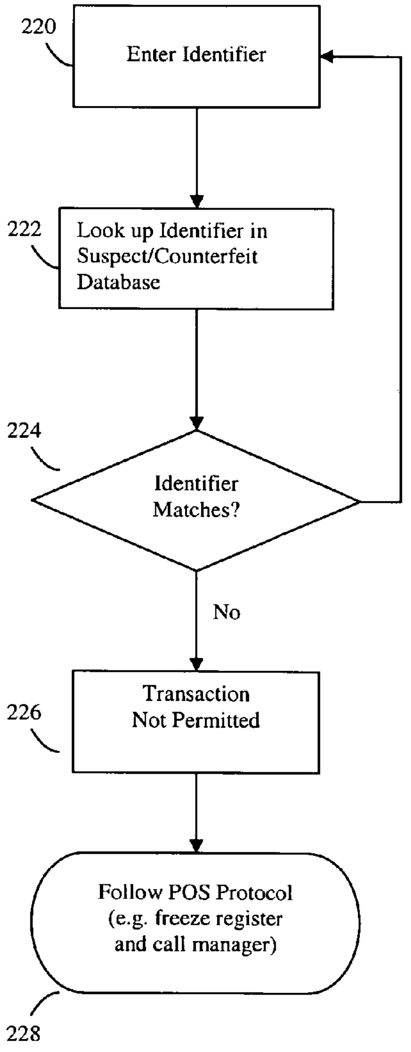
FIG. 2B is a flowchart showing a generic validation system that processes identifiers one-at-a-time and ultimately denies the transaction.

Although FIG. 1B indicates that all of the identifiers are entered together and all of the identifiers are checked together, it should be noted that the identifiers could be entered and checked one at a time, as in FIG. 2B. In FIG. 2B, the system may reach denial step 226 after any, some, or all of the identifiers are checked and a discrepancy discovered. This is accomplished by performing steps 220 (entering an identifier), 222 (looking up the identifier in the database of suspect or counterfeit items), and 224 (determining whether there is a match), for each identifier entered. Again, it should be noted that step 226 may be reached after one discrepancy is found, or after all identifiers are checked, depending on the specific implementation chosen.

Figure 3:
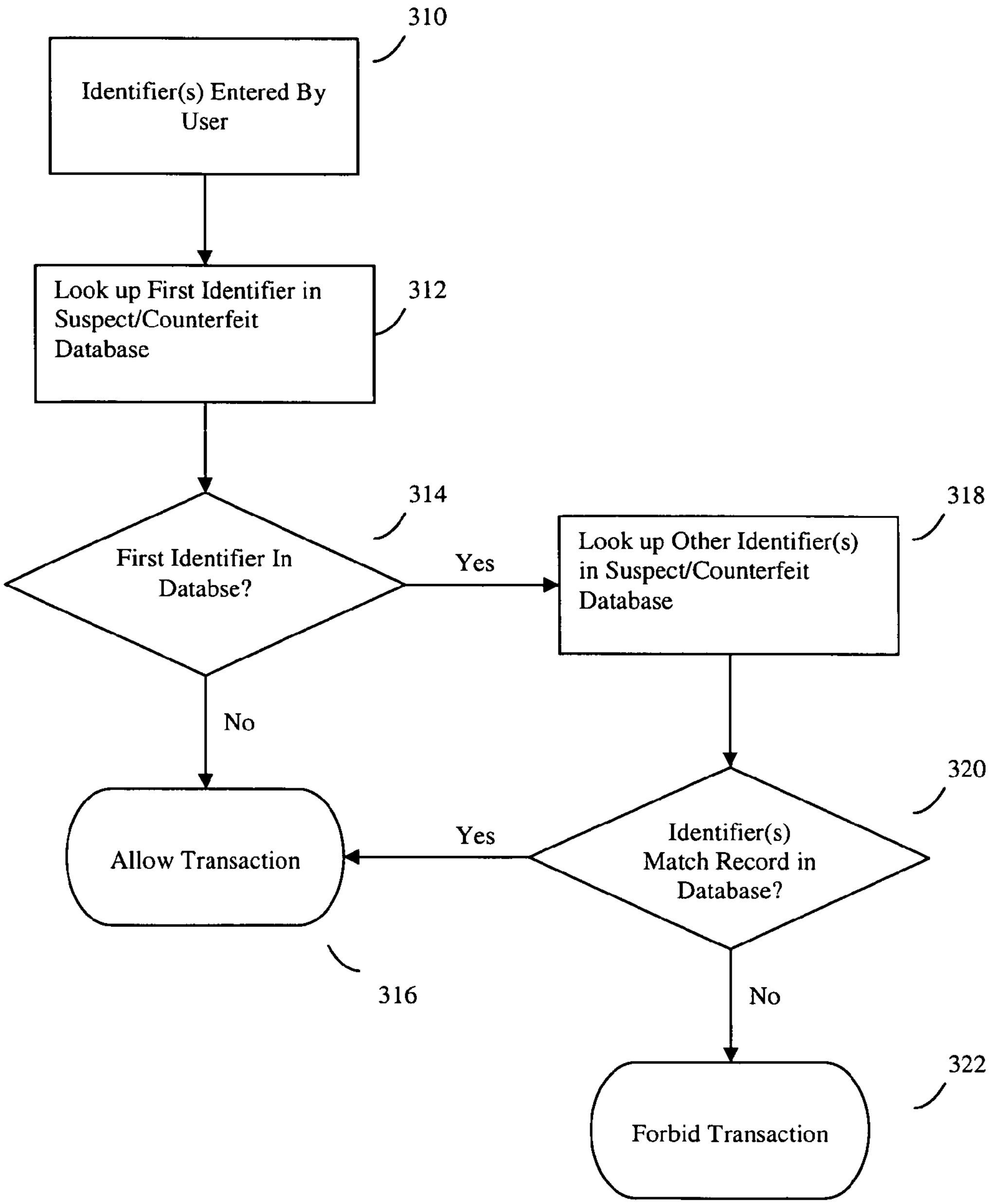
FIG. 3 is a flowchart showing how the system checks the records in the database of suspect or counterfeit labels or item identifiers.

FIG. 3 is a flowchart showing how the system checks the records in the database of suspect or counterfeit items. In this exemplary implementation, all identifiers are entered by the user in step 310. Then, the system checks whether the first identifier (i.e. the UPC, EAN, JAN, RFID, EPC or the like) is present in the database in step 312. If the item is not in the database, the transaction is allowed, as in step 316. However, if the item is in the suspect or counterfeit items database, the system looks up the other entered identifiers in step 318. The system in step 320 determines whether the other identifier match a record in the database. If there is a matching record, the transaction is permitted, as in step 316. However, if there is not a matching record, the transaction is denied, as in step 322. It should be noted that record matching might require exact matches, near matches, (e.g., serial number ranges, date codes, lot numbers, etc.) or matches within a certain range of data, as appropriate to the item in question.

It also should be noted that in this implementation, all of the identifiers are entered at one time (step 310), and all are checked at one time (step 318). However, an alternate implementation might check the identifiers one-at-a-time, as they are entered.

Figure 4:
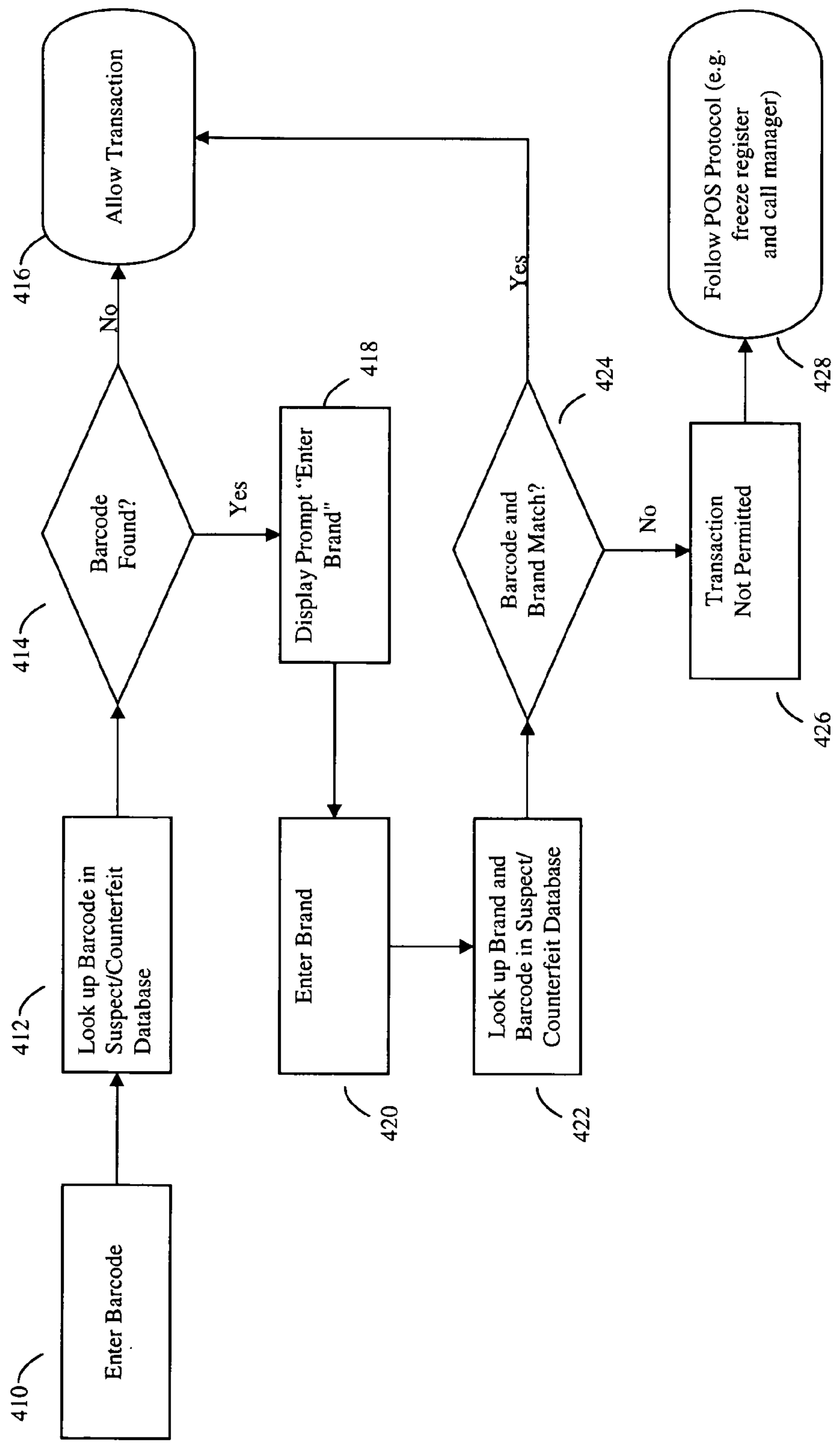
FIG. 4 is a flowchart showing a validation using UPC and Brand Name, in accordance with a preferred embodiment of the instant invention.

FIG. 4 is a flowchart showing a validation using UPC and Brand Name, in accordance with a preferred embodiment of the instant invention. The illustrative embodiment in FIG. 4 in step 410 requires a user to enter (e.g., scan) the barcode of the item to be sold or returned. In step 412, the system looks up the barcode in a database that lists suspect or counterfeit items. If the barcode is not found in the database during comparison step 414, the transaction is allowed, as in step 416. However, if, as in step 418, the item is flagged as a suspect item, the user enters the brand of the item in step 420. It is to be noted that this illustrative embodiment checks the brand, though any identifier of the product could be checked (e.g. model, serial number, model year, etc.). Then, in step 422, the system verifies the barcode and brand combination in the database. If there is a barcode and brand match discovered in comparison step 424, the transaction is allowed. If there is no match, the transaction is denied, as in step 426. Immediately following the denial in step 426, step 428 indicates that POS-specific protocols should be implemented—requiring, for example, the register to be frozen and a manager to be called.

Figure 5:
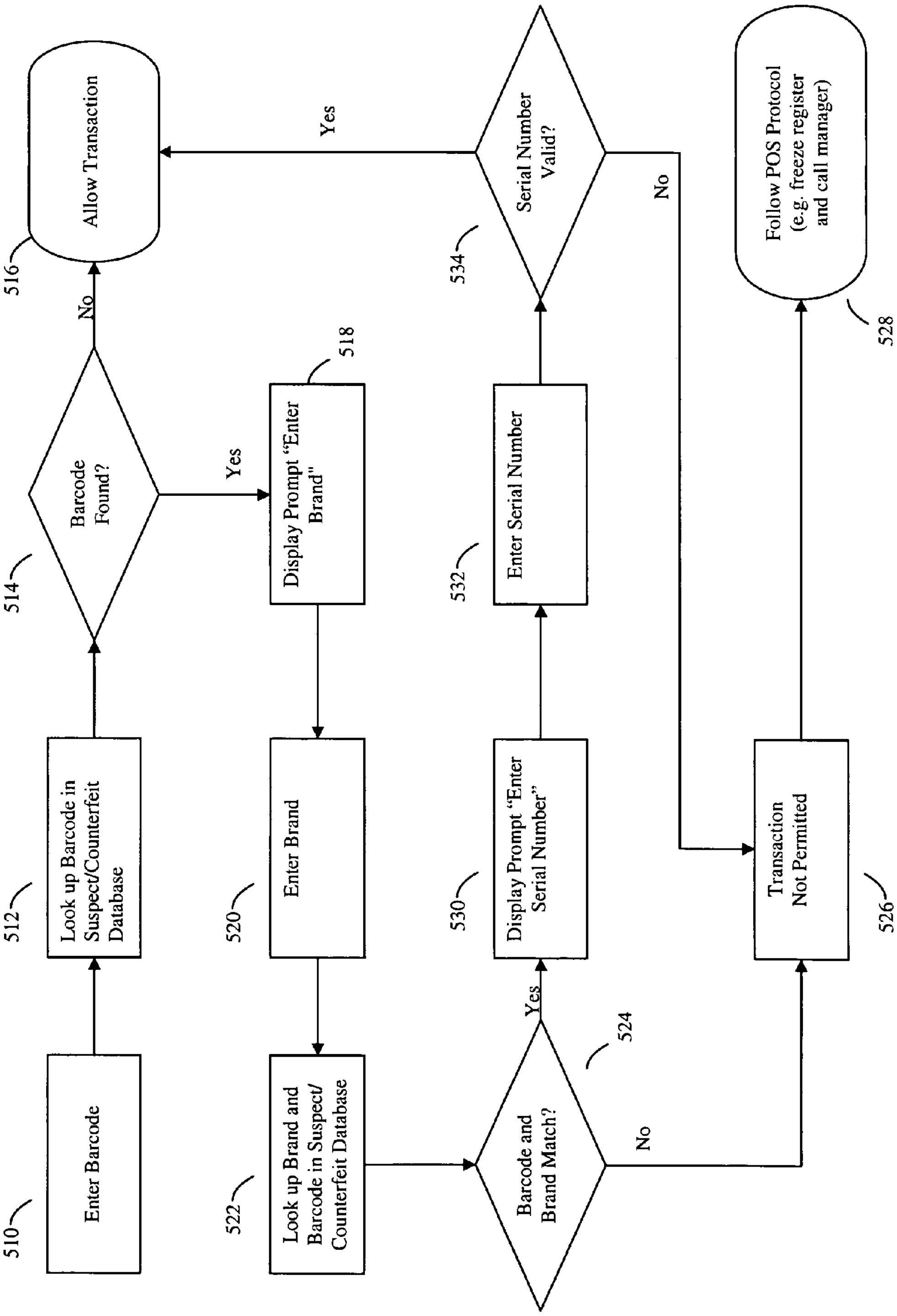
FIG. 5 is a flowchart showing a validation using UPC and product serial number, in accordance with a preferred embodiment of the instant invention.
Figure 7:
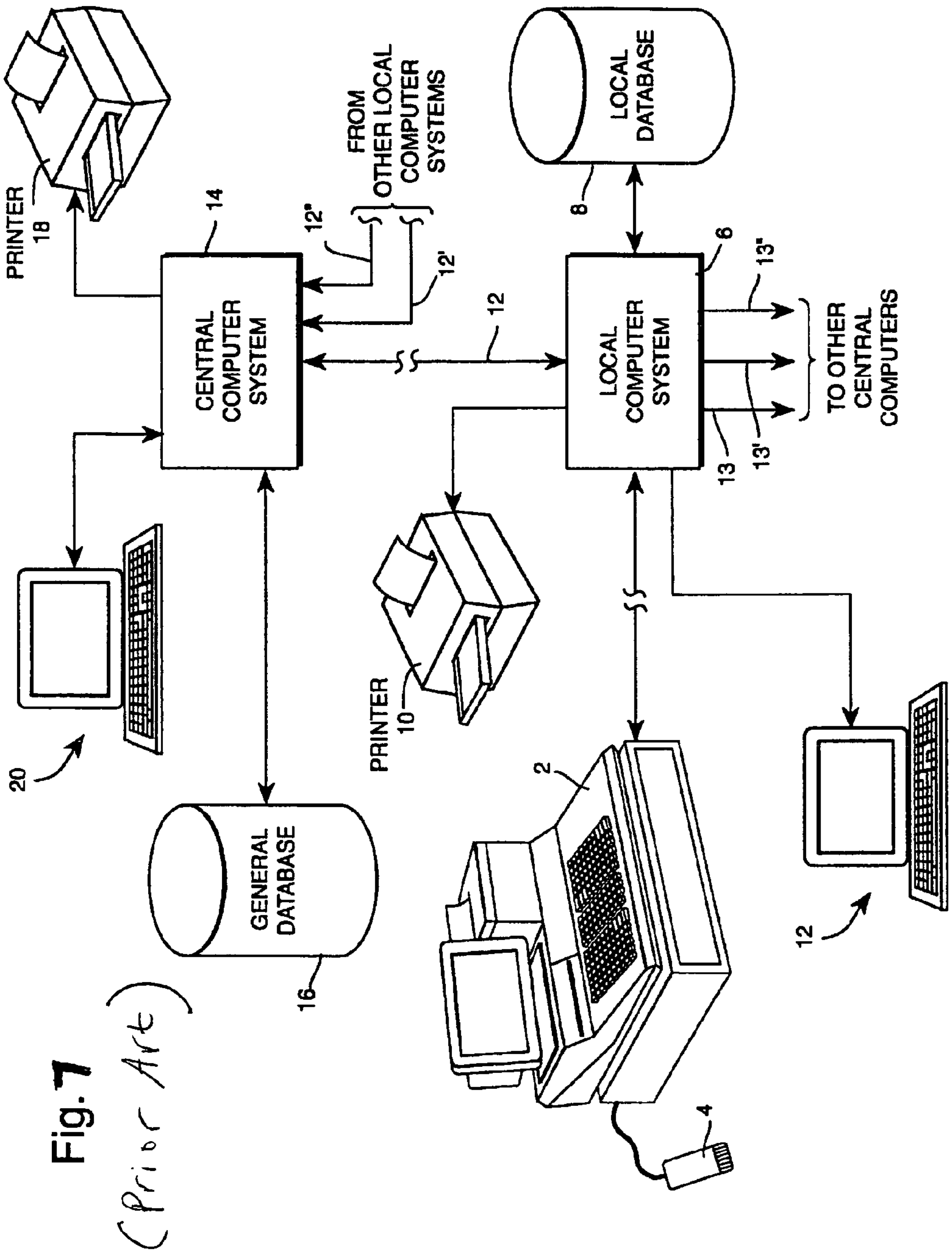
Fig. 7 (Prior Art)

FIG. 5 is a flowchart showing an exemplary second validation process that can be used when the product passes the first validation process described above, and more stringent validation is required or desired (e.g., in the case of same brands/multiple price range items). In this second level of validation, the system will display a prompt to enter the product's serial number (or other unique identifier). Various Electronic Registration Systems ("ER Systems") are available for use in connection with registering product transactions at the point of sale to capture a unique identifier, such as a serial number or the like, as evidenced by U.S. Pat. Nos. 6,018,719; 5,978,774 and 6,085,172, all of which are incorporated herein by reference. FIG. 7, described in detail below, is an exemplary schematic block diagram illustrating an Electronic Registration System. In other embodiments, a manufacturer or retailer may pre-register an item serial numbers or other unique identifiers. In fact, any suitable manner of collecting such information may be used in accordance with the instant invention.

An ER System typically provides a system which enables individual product identification information to be gathered at the point of a transaction for inclusion in one or more transaction databases. In an example embodiment of an ER System, individual product identification information (such as a serial number) is stored in a local transaction database along with additional information including at least the date of the transaction. A transaction receipt such as a customer sales receipt is created and includes the individual product identification information and the date of the transaction. Additionally, the individual product identification information and the transaction date may be communicated to a separate location for inclusion in a general transaction database. The local transaction database may include, for example, sales made by a particular store or sales made by several affiliated stores and is not necessarily co-located with the point of sale.

ER Systems may help maintain a delicate balance that must be maintained between protection of the retailer or manufacturer and consumer satisfaction. Manufacturers and retailers of consumer products often have a standard return policy. For example, a retailer return policy might allow a consumer to return a purchased product for any reason within a certain number of days (e.g., 10 days) after purchase. Additionally, a manufacturer's warranty may permit return of defective products within a particular time period (e.g., 90 days) after purchase, and provide for repairs of defective products within a different time period (e.g., 180 days). Repairs of products after that date would be the responsibility of the consumer. Such return policies are intended to ensure consumer satisfaction while protecting the manufacturer and/or the retailer from improper returns.

Unfortunately, it is often difficult to monitor product returns to ensure proper compliance with a return policy. For example, a consumer who received a product as a gift usually will not have a sales receipt. In such a situation, an uninformed decision must often be made to accept the return or not. If the return is not accepted, the consumer might unfairly be denied a proper return, and the retailer and the manufacturer risk suffering a loss of goodwill. On the other hand, if the return is accepted, the retailer and/or the manufacturer will incur expenses or losses which might be unwarranted. Some retailers seek to minimize the effect of possible improper returns by limiting a consumer to store credit (rather than a refund) or exchanges on items returned without a receipt. This alternative, however, may be unacceptable to a consumer and does not completely eliminate the retailers' exposure to improper returns.

Difficulties associated with returns made without a receipt stem primarily from the inability of the retailer to obtain purchase information (such as sales date, place of purchase, etc.) concerning the individual item for which a return is sought. Without such information, it is usually impossible for the retailer to determine whether the return is in compliance with the return policy.

Prompt and efficient handling of returns and proper enforcement of return policies helps to keep down costs while maintaining consumer confidence and satisfaction. However, efforts to speed handling or improve enforcement lose their value if the expense of those efforts outweighs the accompanying benefit. Accordingly, such efforts must be efficient to benefit the manufacturers, retailer and the consumer.

Accordingly, ER Systems help facilitate authorized product returns yet reduce the incidence of unauthorized returns. Additionally, ER Systems help minimize costs associated with returns, improve retailer efficiency in handling product returns, increase overall customer satisfaction, and provide retailers with immediate access to purchase data information. ER Systems also help enable retailers to more effectively enforce retailer and/or manufacturer return policies, even in situations in which the product was received as a gift or when the customer no longer has the sales receipt.

The illustrative embodiment in FIG. 5 in step 510 requires a user to enter the barcode of the item. In step 512, the system looks up the barcode in a database that lists the barcodes of suspect or counterfeit items. If the barcode is not found in the database during comparison step 514, the transaction is permitted, as in step 516.

However, if the item is flagged as a suspect item, after a display prompt is shown in step 518, the user enters the brand of the item in step 520. It is to be noted that this illustrative embodiment checks the brand, though any identifier of the product could be checked (e.g. model, serial number, model year, etc.). Then, in step 522, the system verifies the barcode and brand combination in the database. If there is not a barcode and brand match discovered in comparison step 524, the transaction is denied, as in step 526. Immediately following the denial in step 526, step 528 indicates that POS-specific protocols should be implemented—requiring, for example, the register to be frozen and a manager to be called.

If there is a valid barcode and brand match, after a display prompt is shown in step 530, the user enters the serial number of the item in step 532. It is to be noted that this illustrative embodiment checks the serial number, though any identifier of the product could be checked (e.g. model number, model year, etc.). Then, in step 534, the system verifies the validity of the entered serial number in the database. It is noted that the use of barcode/brand, as explained herein is only exemplary and other combinations of identifiers may be used.

Another validation method instead of, or in conjunction with, the serial number validation could include a database that contains a list of model numbers that correspond to the appropriate UPC, EAN, JAN, RFID, EPC and/or equivalent numbering code. In accordance with one embodiment, a database is referenced that contains a list of individual or a range of serial numbers produced for a specific UPC, EAN, JAN, RFID, EPC and/or equivalent numbering code or a list of individual or a range of serial numbers produced for a specific UPC that were shipped to a certain retailer or store location (or other location). The system could verify that the serial number (unique identifier) queried was produced for the specific UPC, EAN, JAN, RFID, EPC, and/or equivalent number that was previously enterer.

If the serial number checked is valid for the barcode and brand, the transaction is permitted, as in step 516. However, if the serial number checked is not valid for the barcode and brand, the transaction is denied, as in step 526. Immediately following the denial in step 526, step 528 indicates that POS-specific protocols should be implemented—requiring, for example, the register to be frozen and a manager to be called.

Figure 6:
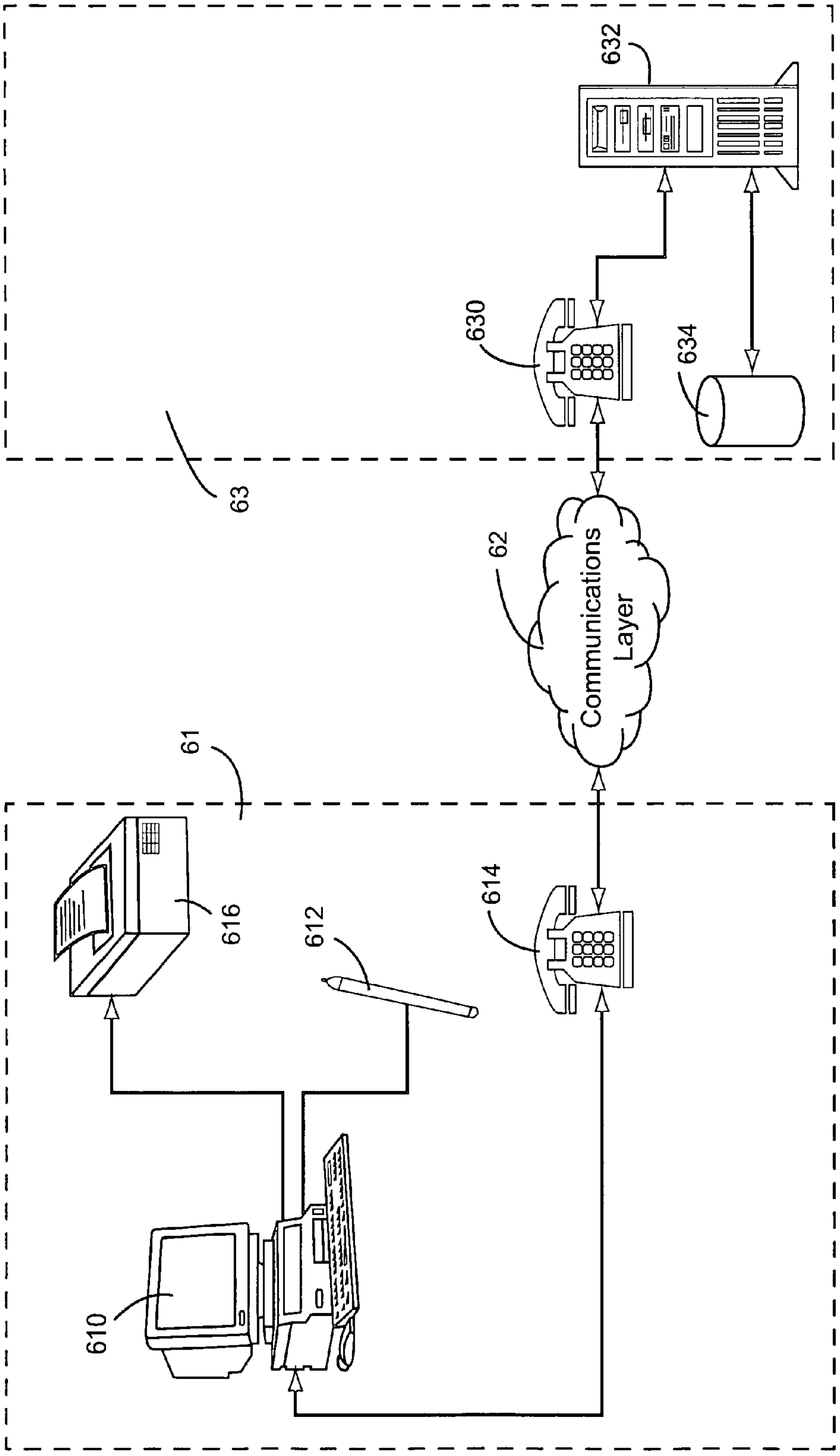
FIG. 6 is a schematic view of one embodiment of a system for loss prevention at a transaction point; and, FIG. 7 is a schematic block diagram illustrating an example of an overall Electronic Registration System.

FIG. 6 is a schematic view of one embodiment of a system for loss prevention at a transaction point. FIG. 6 is divided into three basic areas—transaction side portion 61, communications layer portion 62, and manufacturer side portion (or third party or retailer side portion) 63. It is to be appreciated that other embodiments of the present invention may not require three distinct portions—for example, in an alternative arrangement, a manufacturer side portion might be the same as a transaction side portion.

Briefly, the transaction side portion 61 may include a computer 610 that includes software, firmware, or other programs for processing transactions. Attached to computer 610 is a barcode scanner 612 for scanning SKU numbers or other appropriate identifier. Barcode scanner 612 may be replaced by a keyboard, RFID scanner or other scanning device, as appropriate in other embodiments. Additionally, attached to or incorporated into computer 610 is communications device 614. Communications device 614 may be a modem, Internet card, or other connection, as appropriate to the embodiment of the invention. Lastly, connected to computer 610 is printer 616 for printing transaction records. Of course, in alternative embodiments, transaction receipts may be hand-recorded.

Transaction side portion 61 communicates through communications layer portion 62 to manufacturer side portion 63. Communications layer portion 62 may be the Internet, a dedicated telephone connection, a hardwire connection, or other communications medium, as appropriate to the implementation. In other embodiments, a manufacturer side portion might be unnecessary if a database of suspect or counterfeit item 634 were directly accessible by computer 610.

The manufacturer side portion 63 includes computer system 632, with associated database of suspect or counterfeit items 634. Communications layer portion 62 communicates with communications device 630 to receive data from and send data to the transaction side portion.

After the transaction side facility processes a transaction, the transaction side portion 61 may communicate across the manufacturer side portion 63 to screen the items to determine whether the transaction is allowed by checking the database of suspect or counterfeit items 634. Data is sent back to transaction side portion 61, where the transaction is either permitted or denied. It is to be appreciated that the determination of whether to allow the transaction may be made either on the transaction side portion or the manufacturer side portion, as appropriate to the implementation chosen.

In both the methods and the system described above, further authentication can be performed by flagging serial numbers as they are sold by the store, or a centralized database for all retailers (industry database), where serial numbers are tracked/flagged as they are shipped, sold, returned, and possibly back in inventory for resale. The idea is to prevent duplication and counterfeiting of serial numbers and the use of the same serial number to purchase multiple products.

The example ER System shown in FIG. 7 system may include a point of sale register 2 and an associated bar code scanner 4. The register 2 is preferably connected with a local computer system 6 in a suitable manner. For example, the register 2 may be "hard-wired" to the local computer system 6. Alternatively, the register 2 and the local computer system 6 may communicate, for example, through modems and telephone lines, or over radio communication channels. Any appropriate communication channel may be used.

In certain situations (e.g., single store retailers), it may be advantageous to have the local computer system 6 located in proximity to the register 2. For large chain stores, however, it may be advantageous to situate the local retailer computer 6 at a central location with links to the registers 2 at individual stores. The particular arrangement will depend on the preferences and circumstances of the specific retailer. The local retailer computer system includes an associated local database 8 for storing registration information. Additionally, a local printer 10 and an operator terminal 12 may be provided. The operator terminal may be used, for example, by a store clerk upon return of merchandise to locate pertinent sales information in the local database 8. The printer 10 may be used to produce hard copies of end of day sales reports and the like.

In an exemplary embodiment of the ER System, a communications channel 12 is provided between the retailer computer system 6 and a central computer system 14. The central computer system may, for example, be a manufacturer computer system. Alternatively, the central system could, for example, be a regional computer system for a large chain of stores, a distributor computer system or the like. It should be appreciated that the term communication channel is used herein in its broadest sense, and includes any suitable technique for passing electronic information between systems. Such suitable techniques include, for example, electronic links via modem, radio links, or even communications established by physically transporting a recording medium, such as a magnetic disk, magnetic tape or optical disk, from one system to the other. In the preferred arrangement of the ER System, an electronic link may be established by modem over available commercial telephone lines.

A general database 16 is associated with the central computer system 14 for storing transaction information from a plurality of retailer computer systems 6. Additionally, a printer 18 and an operator terminal 20 may be included with the central computer system 14.

Also as illustrated in FIG. 7, the central computer system 14 may have a number of additional communications links 12', 12", etc. for receiving information from other local computer systems. Thus, for example, a manufacturer may receive information from a number of different retailers. Additionally, the local computer system 6 may include a number of additional communication channels 13, 13', 13", etc. for connecting with other central computer systems. Accordingly, an individual retailer can electronically register products from a number of different manufacturers. The multiple communication channels in FIG. 7 are illustrated with separate lines. It should be noted, however, that separate lines are not necessary. For example, the local computer system 6 more likely would have a single communications line, and connection with the particular central computer system 14 would be made through a modem by dialing the appropriate telephone number.

In accordance with a further exemplary embodiment, the second identifier described herein may be a dynamic or variable identifier in order to provide further fraud protection. As explained in the example above, a predetermined second identifier, associated with the correct UPC (first identifier), is stored in a database as a reference and matched with an input that will corroborate the first identifier. To further safeguard against an employee gaining advance knowledge or anticipating the identity of the stored second identifier and circumventing it by entering the expected second identifier, a dynamic second identifier may be used. For example, several possible second identifiers can be preloaded in the database and a system can be provided to randomly select and prompt (e.g., round robin) for this second identifier. Another example is where several possible second identifiers are stored in the database and the system will select the identifier based on a specific employee handling the transaction, alternating the selection/prompting. Each time the employee enters the same UPC, a different second identifier is selected/prompted for. Further security precautions can be introduced by not allowing the employee to void and reenter another second identifier, thus guessing and/or figuring out what the second identifier may be (this problem can also be addressed by freezing the register and requesting a manager). Again the secure second identifier may be a brand name, model name, model number, lot number, date code, certain printed character/letters on the product or product packaging, etc.

While the preferred forms of the invention have been illustrated and described herein, various changes and/or modifications can be made to the exemplary embodiments herein and still be within the intended scope of this invention.

The invention claimed is:

1. In a system that promotes loss prevention at a transaction point by reducing fraudulent transactions relating to items for sale or return, a method comprising:
- receiving, from a user, a first identifier and a second identifier each indicative of an item for sale or return at the transaction point as a part of a customer transaction;
- looking up the first identifier in a database that includes a plurality of records, each said record corresponding to a suspect or counterfeit item for sale or return;
- if the first identifier does not correspond to a record present in the database, allowing the transaction;
- if the first identifier corresponds to a record present in the database and the second identifier corresponds with an entry in the record associated with the first identifier present in the database, allowing the transaction; and
- if the first identifier corresponds to a record present in the database and the second identifier does not correspond with an entry in the record associated with the first identifier present in the database, denying the transaction.

2. A method as in claim 1, wherein the system looks up the first identifier and the second identifier together.

3. A method as in claim 1, wherein the system looks up the second identifier only if the first identifier is present in the database.

4. A method as in claim 1, wherein the transaction point is a point of sale.

5. A method as in claim 1, wherein the transaction point is a point of return.

6. A method as in claim 1, wherein the first identifier is a Universal Product Code (UPC).

7. A method as in claim 1, wherein the first identifier is a EAN Article Numbering Code (EAN).

8. A method as in claim 1, wherein the first identifier is a Japanese Article Numbering Code (JAN).

9. In a system that promotes loss prevention at a transaction point by reducing fraudulent transactions relating to items for sale or return, a method comprising:
- receiving, from a user, a first identifier and a plurality of second identifiers, each of the first identifier and the plurality of second identifiers being indicative of an item for sale or return at the transaction point as a part of a customer transaction;
- looking up the first identifier in a database that includes a plurality of records, each said record corresponding to a suspect or counterfeit item for sale or return;
- if the first identifier does not correspond to a record present in the database, allowing the transaction;
- if the first identifier corresponds to a record present in the database and one or more of the plurality of second identifiers correspond with one or more respective entries in the record associated with the first identifier present in the database, allowing the transaction;

if the first identifier corresponds to a record present in the database and one or more of the plurality of second identifiers do not correspond with one or more respective entries in the record associated with the first identifier present in the database, denying the transaction.

10. A method as in claim 9, wherein the system looks up the first identifier and the plurality of second identifiers together.

11. A method as in claim 9, wherein the system looks up the plurality of second identifiers all together only if the first identifier is present in the database.

12. A method as in claim 9, wherein the system looks up the plurality of second identifiers one at a time until all are checked or a discrepancy is discovered only if the first identifier is present in the database.

13. A method as in claim 9, wherein the transaction point is a point of sale.

14. A method as in claim 9, wherein the transaction point is a point of return.

15. A method as in claim 9, wherein a first identifier is a Universal Product Code (UPC).

16. A method as in claim 9, wherein the first identifier is a EAN Article Numbering Code (EAN).

17. A method as in claim 9, wherein the first identifier is a Japanese Article Numbering Code (JAN).

18. A method, as in claim 9, wherein a second identifier is a brand name.

19. A method, as in claim 9, wherein a second identifier is a serial number.

20. A system that promotes loss prevention at a transaction point by reducing fraudulent transactions relating to items for sale or return, comprising:

an input device configured to receive from a user a first identifier and a second identifier each indicative of an item for sale or return at the transaction point as a part of a customer transaction;

a search routine configured to look up the first identifier in a database that includes a plurality of records, each said record corresponding to a suspect or counterfeit item for sale or return; and, a gatekeeper switch configured to:

allow the transaction if the first identifier does not correspond to a record present in the database;

allow the transaction if the first identifier corresponds to a record present in the database and the second identifier corresponds with an entry in the record associated with the first identifier present in the database; and, deny the transaction if the first identifier corresponds to a record present in the database and the second identifier does not correspond with an entry in the record associated with the first identifier present in the database.

21. A system as in claim 20, wherein the input device is a scanner.

22. A system as in claim 20, wherein the input device is a keyboard.

23. A system as in claim 20, wherein the searching routine looks up the first identifier and the second identifier together.

24. A system as in claim 20, wherein the searching routine looks up the second identifier only if the first identifier is present in the database.

25. A system as in claim 20, wherein the transaction point is a point of sale.

26. A system as in claim 20, wherein the transaction point is a point of return.

27. A system as in claim 20, wherein the first identifier is a Universal Product Code (UPC).

28. A system as in claim 20, wherein the first identifier is a EAN Article Numbering Code (EAN).

29. A system as in claim 20, wherein the first identifier is a Japanese Article Numbering Code (JAN).

30. A system that promotes loss prevention at a transaction point by reducing fraudulent transactions relating to items for sale or return, comprising:

an input device, configured to receive from a user a first identifier and a plurality of second identifiers, each of the first identifier and the plurality of second identifiers being indicative of an item for sale or return at the transaction point as a part of a customer transaction;

a searching routine configured to, look up the first identifier in a database that includes a plurality of records, each said record corresponding to a suspect or counterfeit item for sale or return; and, a gatekeeper switch configured to:

allow the transaction if the first identifier does not correspond to a record present in the database;

allow the transaction if the first identifier corresponds to a record present in the database and one ore more of the plurality of second identifiers correspond with one or more respective entries in the record associated with the first identifier present in the database; and, deny the transaction if the first identifier corresponds to a record present in the database and one or more of the plurality of second identifiers do not correspond with one or more respective entries in the record associated with the first identifier present in the database.

31. A system as in claim 30, wherein the input device is a scanner.

32. A system as in claim 30, wherein the input device is a keyboard.

33. A system as in claim 30, wherein the searching routine looks up the first identifier and the plurality of second identifiers together.

34. A system as in claim 30, wherein the search routine looks up the plurality of second identifiers all together only if the first identifier is present in the database.

35. A system as in claim 30, wherein the search routine looks up the plurality of second identifiers one at a time until all are checked or a discrepancy is discovered only if the first identifier is present in the database.

36. A system as in claim 30, wherein the transaction point is a point of sale.

37. A system as in claim 30, wherein the transaction point is a point of return.

38. A system as in claim 30, wherein a first identifier is a Universal Product Code (UPC).

39. A system as in claim 30, wherein the first identifier is a EAN Article Numbering Code (EAN).

40. A system as in claim 30, wherein the first identifier is a Japanese Article Numbering Code (JAN).

41. A system as in claim 30, wherein a second identifier is a brand name.

42. A system as in claim 30, wherein a second identifier is a serial number.

* * * * *